(12) United States Patent
Kusakari

(10) Patent No.: US 8,056,120 B2
(45) Date of Patent: Nov. 8, 2011

(54) AUTHENTICATION APPARATUS, AUTHENTICATION METHOD, AND COMPUTER PROGRAM PRODUCT

(75) Inventor: Shin Kusakari, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 688 days.

(21) Appl. No.: 12/134,692

(22) Filed: Jun. 6, 2008

(65) Prior Publication Data

US 2008/0307514 A1 Dec. 11, 2008

(30) Foreign Application Priority Data

Jun. 11, 2007 (JP) ................................. 2007-154464
May 21, 2008 (JP) ................................. 2008-132879

(51) Int. Cl.
*G06F 7/04* (2006.01)
(52) U.S. Cl. .......... 726/2; 726/3; 726/4; 726/16; 726/17
(58) Field of Classification Search .................. 726/2–4, 726/16–17
See application file for complete search history.

(56) References Cited

U.S. PATENT DOCUMENTS

| | | | | |
|---|---|---|---|---|
| 5,922,073 | A * | 7/1999 | Shimada | 726/6 |
| 6,088,805 | A * | 7/2000 | Davis et al. | 726/10 |
| 6,173,172 | B1 * | 1/2001 | Masuda et al. | 455/410 |
| 6,356,941 | B1 * | 3/2002 | Cohen | 709/219 |
| 6,466,804 | B1 * | 10/2002 | Pecen et al. | 455/558 |
| 7,281,263 | B1 * | 10/2007 | LaMastres et al. | 726/2 |
| 7,591,020 | B2 * | 9/2009 | Kammer et al. | 726/26 |
| 2002/0177449 | A1 * | 11/2002 | McDonnell et al. | 455/456 |
| 2003/0139190 | A1 * | 7/2003 | Steelberg et al. | 455/456 |
| 2005/0154914 | A1 * | 7/2005 | Eguchi et al. | 713/201 |
| 2005/0260996 | A1 * | 11/2005 | van de Groenendaal | 455/445 |
| 2007/0053306 | A1 * | 3/2007 | Stevens | 370/252 |
| 2007/0289002 | A1 * | 12/2007 | van der Horst et al. | 726/9 |
| 2008/0016582 | A1 * | 1/2008 | Morimoto | 726/28 |
| 2008/0222705 | A1 * | 9/2008 | Goodmon et al. | 726/4 |
| 2009/0043681 | A1 * | 2/2009 | Shoji et al. | 705/35 |
| 2009/0165089 | A1 * | 6/2009 | Bennett | 726/3 |
| 2009/0254975 | A1 * | 10/2009 | Turnbull et al. | 726/3 |

FOREIGN PATENT DOCUMENTS

| | | |
|---|---|---|
| JP | 2003-242042 | 8/2003 |
| JP | 2006-319421 | 11/2006 |
| JP | 4012746 | 9/2007 |

OTHER PUBLICATIONS

"The American Heritage College Dictionary", 4th Edition, ISBN: 0618098488, 2002, p. 498.*

* cited by examiner

*Primary Examiner* — Peter Poltorak
(74) *Attorney, Agent, or Firm* — Oblon, Spivak, McClelland, Maier & Neustadt, L.L.P.

(57) ABSTRACT

A monitoring unit monitors a client terminal used by a user, and when there is a predetermined access operation to a resource from the client terminal, acquires identification information from the client terminal. A verifying unit verifies whether the identification information matches stored identification information. When it is verified that the identification information matches the stored identification information, a referring unit refers to an access management system to check an entry status of the user to a facility. A determining unit determines whether to allow the access operation based on a check result from the referring unit.

12 Claims, 14 Drawing Sheets

| USER INFORMATION | RESOURCE | PERMITTED AREA | DENIED AREA |
|---|---|---|---|
| ID0001 | RESEARCH AND DEVELOPMENT DATABASE | AREA A | AREA C |
| | QUALITY CONTROL DATABASE | AREA B | AREA D |
| ID0002 | RESEARCH AND DEVELOPMENT DATABASE | AREA A | AREA D |
| | QUALITY CONTROL DATABASE | AREA A | AREA E |
| ID0003 | RESEARCH AND DEVELOPMENT DATABASE | AREA B | AREA E |
| | QUALITY CONTROL DATABASE | AREA A | AREA D |
| ... | ... | ... | ... |

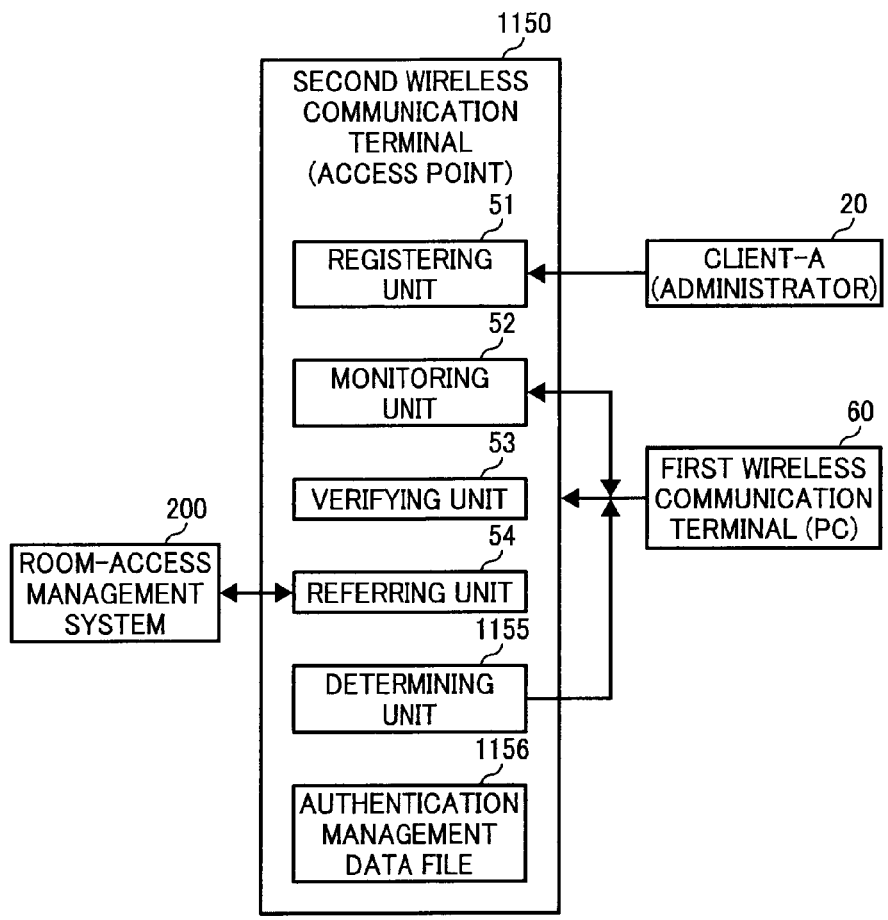

| USER INFORMATION | PHYSICAL ADDRESS | PERMITTED RANGE |
|---|---|---|
| ID0001 | 00007naabbcc | LESS THAN 10 m |
| ID0002 | 00007maabbdd | LESS THAN 15 m |
| ID0003 | 00007maaccee | LESS THAN 5 m |
| ... | ... | ... |

AUTHENTICATION APPARATUS, AUTHENTICATION METHOD, AND COMPUTER PROGRAM PRODUCT

CROSS-REFERENCE TO RELATED APPLICATIONS

The present application claims priority to and incorporates by reference the entire contents of Japanese priority documents 2007-154464 filed in Japan on Jun. 11, 2007 and 2008-132879 filed in Japan on May 21, 2008.

BACKGROUND OF THE INVENTION

1. Field of the Invention

The present invention relates to an authentication apparatus, an authentication method, and a computer program product.

2. Description of the Related Art

Computer systems using personal computers (PC), workstations (WS), and servers are widely used by various users in various places. For example, computer systems are used in companies, research institutes, schools, public institutions, governments and public offices, and the like. The computer systems used in the above places generally handle various data containing confidential data such as personal information of employees and customers, new product information, technical information, and management information. Because such information is confidential, it is necessary to prevent leakage of information.

Meanwhile, communication environments using broadband has been widely enhanced, so that people can access resources used in their work environments even they are out of offices. Such environments enhance conveniences of use of communication terminals; however, risk of leakage of information increases at the same time. For example, information may be easily leaked from PCs in public places such as air ports, trains, and coffee shops. More specifically, even when eavesdropping is prevented with communication encryption techniques, if a user displays a design diagram of a new product on a screen of a PC, information on the new product may be leaked to other people only by taking a glance at the screen. With conventional techniques, it is difficult to assuredly prevent leakage of information, and prevention of the leakage of information is attempt by reminding users to be careful of handling of data.

Furthermore, wireless communication such as a wireless LAN has been widely used, so that convenient communication environments are realized. However, wireless communication is disadvantageous in that a large number of users including unknown users and fraudulent users can access resources within a service area of the wireless communication. High-secure encryption methods and authentication methods are developed for counteracting the above situation; however, they are not yet used in common.

A conventional access authentication method for authenticating a user to access predetermined contents data in a client terminal is disclosed in, for example, Japanese Patent Application Laid-open No. 2003-242042. Specifically, user authentication is performed such that identification information unique to a client is acquired in an environment where contents data is downloaded, the identification information is encrypted and then written to a password file, password information is extracted from the downloaded contents data, the password information is encrypted and then written to the password file, and determination is performed whether the acquired identification information and the extracted password information are identical to those pre-registered on the password file.

The above authentication method uses information on an environment (client) of the user upon performing authentication of users who accesses contents data on a client terminal. Therefore, the user is not required to perform operations for the authentication. However, it is still difficult to prevent leakage of information caused by accesses to resources from places out of permitted places and network connection by unknown users and fraudulent users.

SUMMARY OF THE INVENTION

It is an object of the present invention to at least partially solve the problems in the conventional technology.

According to an aspect of the present invention, there is provided an authentication apparatus that performs an authentication of an access to a resource on a network and a connection to the network by a user. The authentication apparatus includes a storage unit that stores therein a data file that contains first identification information for identifying either one of a user and a client terminal used by the user; a monitoring unit that monitors the client terminal, and when there is a predetermined access operation to the resource from the client terminal, acquires second identification information from the client terminal; a verifying unit that verifies whether the first identification information matches the second identification information, and when it is verified that the first identification information matches the second identification information, refers to an access management system that is connected to the network and manages an entry status of the user to a facility to check the entry status of the user to the facility; and a determining unit that determines whether to allow the access operation based on a result from the verifying unit.

Furthermore, according to another aspect of the present invention, there is provided an authentication method of performing an authentication of an access to a resource on a network and a connection to the network by a user. The authentication method includes monitoring the client terminal, and when there is a predetermined access operation to the resource from the client terminal, acquiring identification information for identifying either one of a user and a client terminal used by the user from the client terminal; verifying whether acquired identification information matches identification information stored in a storage unit, and when it is verified that the acquired identification information matches stored identification information, referring to an access management system that is connected to the network and manages an entry status of the user to a facility to check the entry status of the user to the facility; and determining whether to allow the access operation based on a result at the verifying.

Moreover, according to still another aspect of the present invention, there is provided a computer program product including a computer-usable medium having computer-readable program codes embodied in the medium for performing an authentication of an access to a resource on a network and a connection to the network by a user. The program codes when executed cause a computer to execute monitoring the client terminal, and when there is a predetermined access operation to the resource from the client terminal, acquiring identification information for identifying either one of a user and a client terminal used by the user from the client terminal; verifying whether acquired identification information matches identification information stored in a storage unit, and when it is verified that the acquired identification information matches stored identification information, referring to an access management system that is connected to the network and manages an entry status of the user to a facility to check the entry status of the user to the facility; and determining whether to allow the access operation based on a result at the verifying.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a block diagram of a second wireless communication terminal according to a fourth embodiment of the present invention;

FIG. 12 is a table of an example of an authentication management data file shown in FIG. 11;

DETAILED DESCRIPTION OF THE PREFERRED EMBODIMENTS

Exemplary embodiments of the present invention are explained in detail below with reference to the accompanying drawings.

Figure 1:
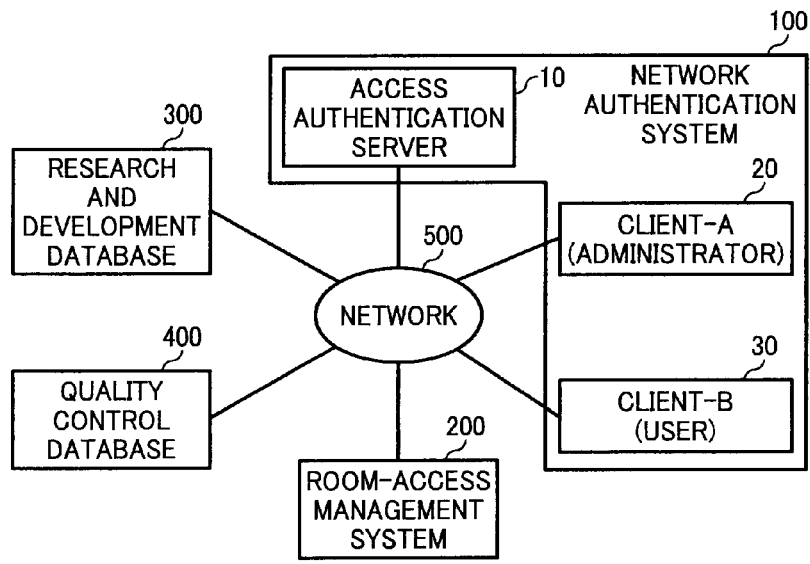
FIG. 1 is a schematic diagram of a network configuration including a network authentication system according to a first embodiment of the present invention.

A network authentication system 100 according to a first embodiment of the present invention authenticates a client to allow access to resources in a network. FIG. 1 is a schematic diagram of a network configuration including the network authentication system 100. The network authentication system 100 includes an access authentication server 10, a client-A 20, and a client-B 30. The access authentication server 10, the client-A 20, and the client-B 30 are connected to a network 500. The network authentication system 100 is connected to resources such as a room-access management system 200, a research and development database 300, and a quality control database 400 via the network 500.

The resources on the network 500 are not limited to those described above. Other databases such as a sales history database and a human resource database can be used as the resources. It is assumed in the first embodiment that information indicative of the research and development database 300, such as URL and file name, is registered as information indicative of an access-controlled resource on an authentication management data file 16 in the access authentication server 10. On the other hand, it is assumed that information indicative of the quality control database 400 is not registered as the access-controlled resource on the access authentication server 10.

The room-access management system 200 manages entry and exit of a user to/from a predetermined place and stores therein entry-exit log data. For example, when a user, such as a company member, swipes an IC card, such as a company ID card, through an IC card reader at an entrance to a room, and if the user is allowed to enter the room, the room-access management system 200 unlocks the entrance and records entry-exit log data with respect to the user. The room-access management system 200 is connected to the network authentication system 100 via the network 500. Therefore, the access authentication server 10 can acquire the entry-exit log data indicative of whether a user is in a predetermined place controlled by the room-access management system 200.

Figure 2:
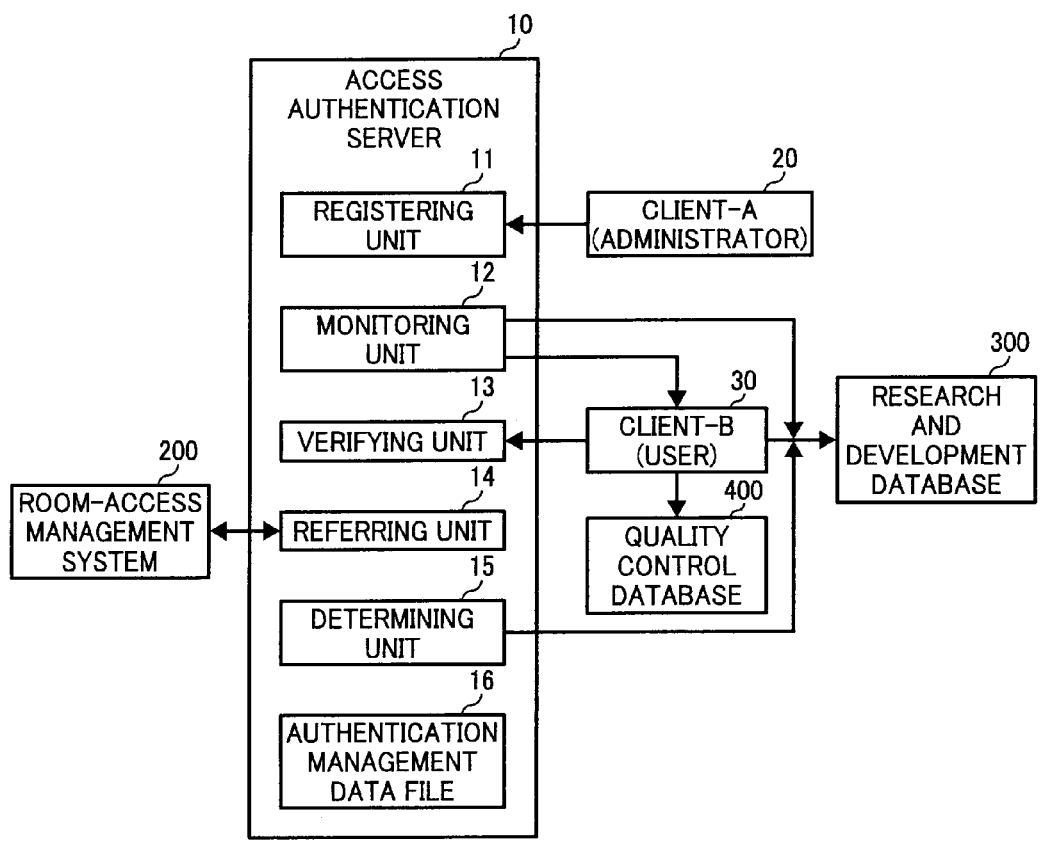
FIG. 2 is a functional block diagram of an access authentication server shown in FIG. 1.

FIG. 2 is a functional block diagram of the access authentication server 10. Arrows in FIG. 2 indicate data flow in an authentication process performed by the network authentication system 100. The access authentication server 10 includes a registering unit 11, a monitoring unit 12, a verifying unit 13, a referring unit 14, a determining unit 15, and the authentication management data file 16.

The authentication management data file 16 stores therein information on an access-controlled resource and user information of a user who is allowed to access the access-controlled resource, in an associated manner. Examples of the information on an access-controlled resource include URL and file name of an access-controlled resource. The user information is for identifying a user. Examples of the user information include user ID, password, fingerprint, voiceprint, and retina.

The registering unit 11 generates the authentication management data file 16 with no data in a recording medium such as a hard disk drive (HDD), and registers the information indicative of the access-controlled resource, such as URL and file name, and the user information received from the client-A 20 operated by a network administrator on the authentication management data file 16. In this state, a user whose user information is registered on the authentication management data file 16 is allowed to access the access-controlled resource.

As described above, information indicative of the research and development database 300, such as URL and file name, is registered as information indicative of an access-controlled resource on the authentication management data file 16.

The monitoring unit 12 monitors an access operation to a resource on the network 500 by the client-B 30 operated by a user. Upon detecting the access operation to the access-control resource, the monitoring unit 12 requires the user of the client-B 30 to input the user information and receives the user information from the client-B 30.

On the other hand, the monitoring unit 12 does not require the user to input user information when an access operation to resources other than the access-controlled resource is performed. Specifically, the monitoring unit 12 requires the user to input the user information for accessing the research and development database 300, and does not require the user to input the user information for accessing the quality control database 400.

The verifying unit 13 verifies whether user information identical to the user information input from the client-B 30 due to a command from the monitoring unit 12 is registered on the authentication management data file 16. Thereby, the verifying unit 13 determines whether a user of input user information is the same user whose user information is registered on the authentication management data file 16, that is, whether the user is allowed to access the access-controlled resource.

The referring unit 14 refers to the room-access management system 200 to check the entry-exit log data (entry-exit state) with respect to the user whose user information is verified by the verifying unit 13 such that the input user information (user information of a user who has accessed the access-controlled resource) is identical to the user information registered on the authentication management data file 16. Then, the referring unit 14 determines whether the user who has accessed the access-controlled resource is in a place where the access-controlled resource is set. The referring unit 14 can be configured to determine whether the user who has accessed the access-controlled resource is in a predetermined place other than a place where the access-controlled resource is set.

The determining unit 15 receives a result of a reference from the referring unit 14. When the user who has accessed the access-controlled resource is in a place where the access-controlled resource is set, the determining unit 15 determines to permit the user to access the access-controlled resource and sends a notice of access permission to the client-B 30.

Figure 3:
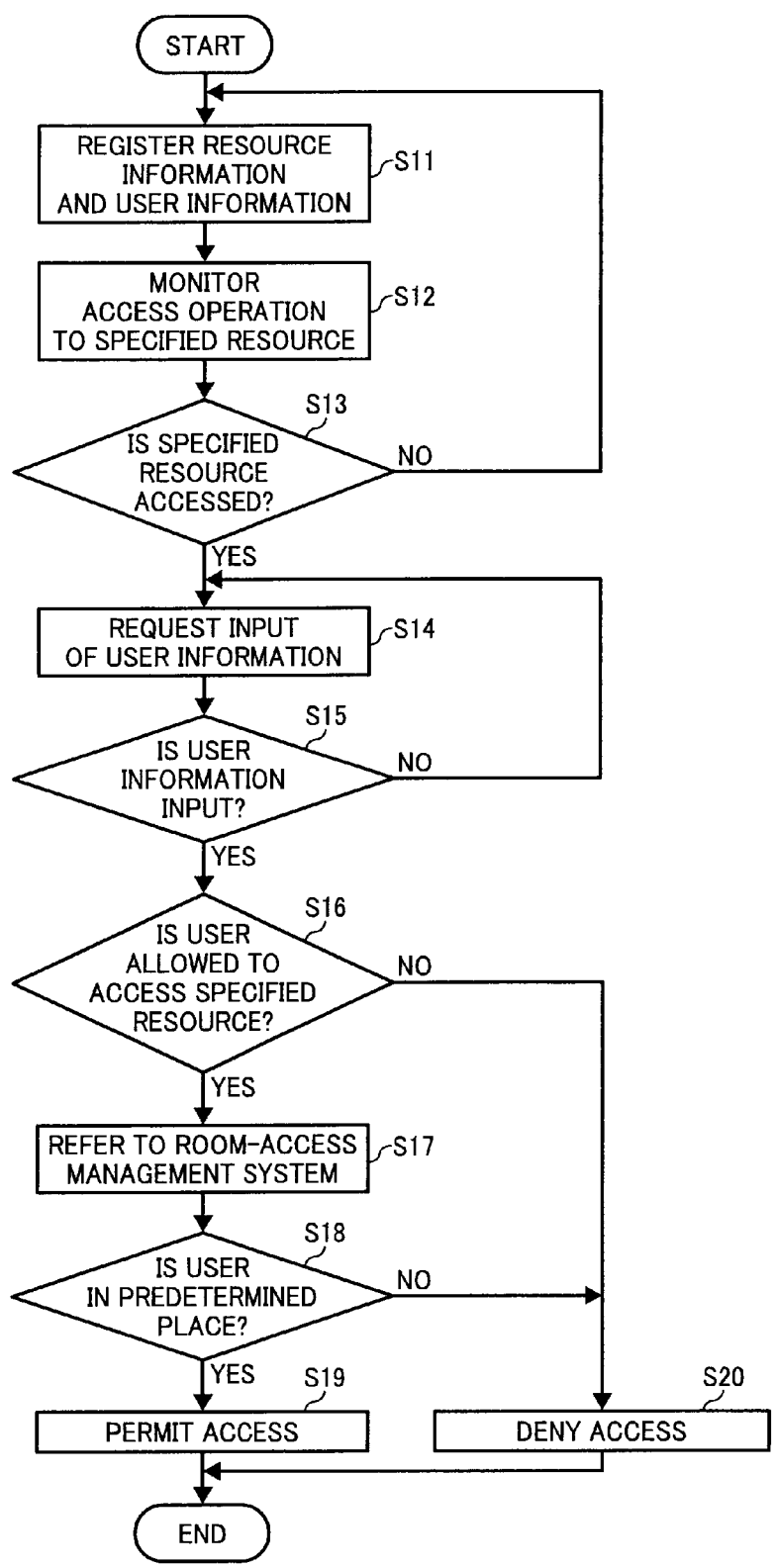
FIG. 3 is a flowchart of an authentication process according to the first embodiment.

FIG. 3 is a flowchart of an authentication process performed by the access authentication server 10.

The registering unit 11 registers information indicative of an access-controlled resource (special resource) specified by a network administrator and user information (Step S11). According to the first embodiment, access control means only a person in a predetermined place is allowed to access resources and all the resources are set to be accessed only within the predetermined place.

The monitoring unit 12 monitors an access operation from the client-B 30 to the registered access-controlled resource (Step S12). For example, the monitoring unit 12 monitors whether the client-B 30 issues an access request command to a database in the access-controlled resource. Other monitoring methods are also applicable.

When the client-B 30 accesses the access-controlled resource (Yes at Step S13), the monitoring unit 12 issues a request of input of user information to the client-B 30 (Step S14). The monitoring unit 12 continues to issue the request until receipt of the user information (No at step S15).

When the monitoring unit 12 receives the user information from the client-B 30 (Yes at Step S15), the verifying unit 13 verifies whether the user is allowed to access the access-controlled resource by checking whether user information identical to the received user information is registered on the authentication management data file 16.

When it is determined that the user is allowed to access the access-controlled resource (Yes at Step S16), the referring unit 14 refers to the room-access management system 200 to check the entry-exit log data with respect to the user (Step S17). On the other hand, when user information identical to the received user information is not registered on the authentication management data file 16, that is, when it is determined that the user is not allowed to access the access-controlled resource (No at Step S16), the determining unit 15 determines to deny the access to the access-controlled resource and sends a notice of access denial to the client-B 30 (Step S20).

As a result of reference at Step S17, when it is confirmed that the user is in the place where the access-controlled resources is set (Yes at Step S18), the determining unit 15 determines to permit the access to the access-controlled resource and sends a notice of access permission to the client-B 30 (Step S19). On the other hand, when it is confirmed that the user is out of the place where the access-controlled resources is set (No at Step S18), the determining unit 15 determines to deny the access to the access-controlled resource and sends a notice of access denial to the client-B 30 (Step S20).

As described above, in the network authentication system 100, when the client-B 30 accesses the access-controlled resource, the access authentication server 10 receives the user information from the client-B 30, verifies whether the user information from the client-B 30 is identical to the user information registered on the authentication management data file 16, and refers to the room-access management system 200 to check the entry-exit log data with respect to the user. Then, when the user who has accessed the access-controlled resource is in the place where the access-controlled resource is set, the user is allowed to access the access-controlled resource. On the other hand, when the user who has accessed the access-controlled resource is in the place where the access-controlled resource is set, the user is not allowed to access the access-controlled resource. Therefore, it is possible to effectively control accesses to resources on a network from a place other than a permitted place and network communications by users including unknown users and unauthenticated users in a communication environment where broadband communication and wireless communication are widely used.

Although it is assumed in the first embodiment that accesses to all the resources are allowed only within a predetermined place, the access control can be performed by using other methods. For example, it is possible to specify a resource whose access is allowed within a predetermined place. It is still possible to allow accesses to a resource within a place specified with respect to the resource.

A second embodiment of the present invention is described below. An access control according to the second embodiment is performed such that accesses to a specified resource is not allowed in a place other than a predetermined place and accesses to a resource is not allowed in a place specified with respect to the resource.

Figures 4, 5:
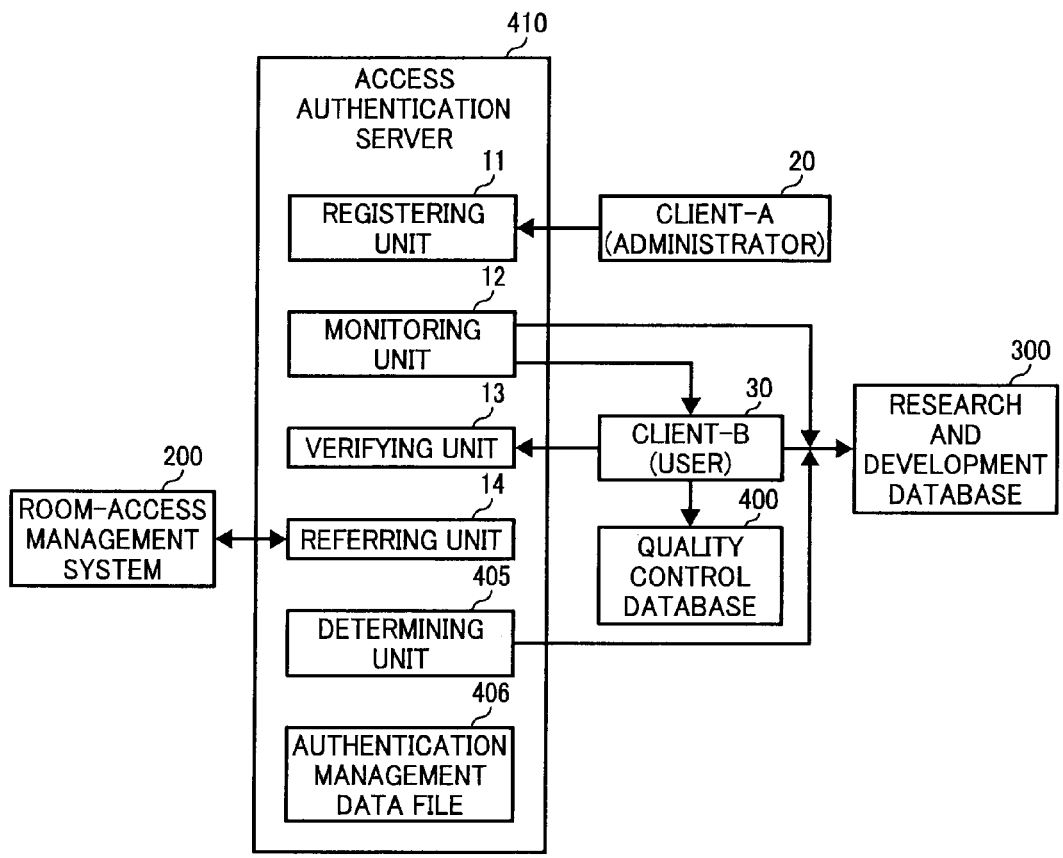
FIG. 4 is a functional block diagram of an access authentication server according to a second embodiment of the present invention.
FIG. 5 is a table of an example of an authentication management data file shown in FIG. 4.

A network configuration of a network authentication system according to the second embodiment is the same as that in the first embodiment. FIG. 4 is a functional block diagram of an access authentication server 410 according to the second embodiment. The access authentication server 410 includes the registering unit 11, the monitoring unit 12, the verifying unit 13, the referring unit 14, a determining unit 405, and an authentication management data file 406. Functions and configurations of the registering unit 11, the monitoring unit 12, the verifying unit 13, and the referring unit 14 are the same as those described in the first embodiment.

The authentication management data file 406 stores therein user information, information on an access-controlled resource, permitted area, and denied area in an associated manner. It is assumed in the second embodiment that the permitted area and the denied area are within a predetermined place; however, it is not thus limited. FIG. 5 is a table of an example of the authentication management data file 406. Specifically, a user identified by user information of "ID0001" is allowed to access a research and development database when the user is in a permitted area "area A", and is not allowed to access the research and development database when the user is in a denied area "area C".

The determining unit 405 determines to permit the user to access the access-controlled resource when the referring unit 14 confirms from the authentication management data file 406 that the user is in a permitted area of the access-controlled resource or the user is in an area other than a denied area of the access-controlled resource. Furthermore, the determining unit 405 determines to deny the access to the access-controlled resource when the referring unit 14 confirms from the authentication management data file 406 that the user is in a denied area of the access-controlled resource or the user is in an area other than a permitted area of the access-controlled resource.

Figure 6:
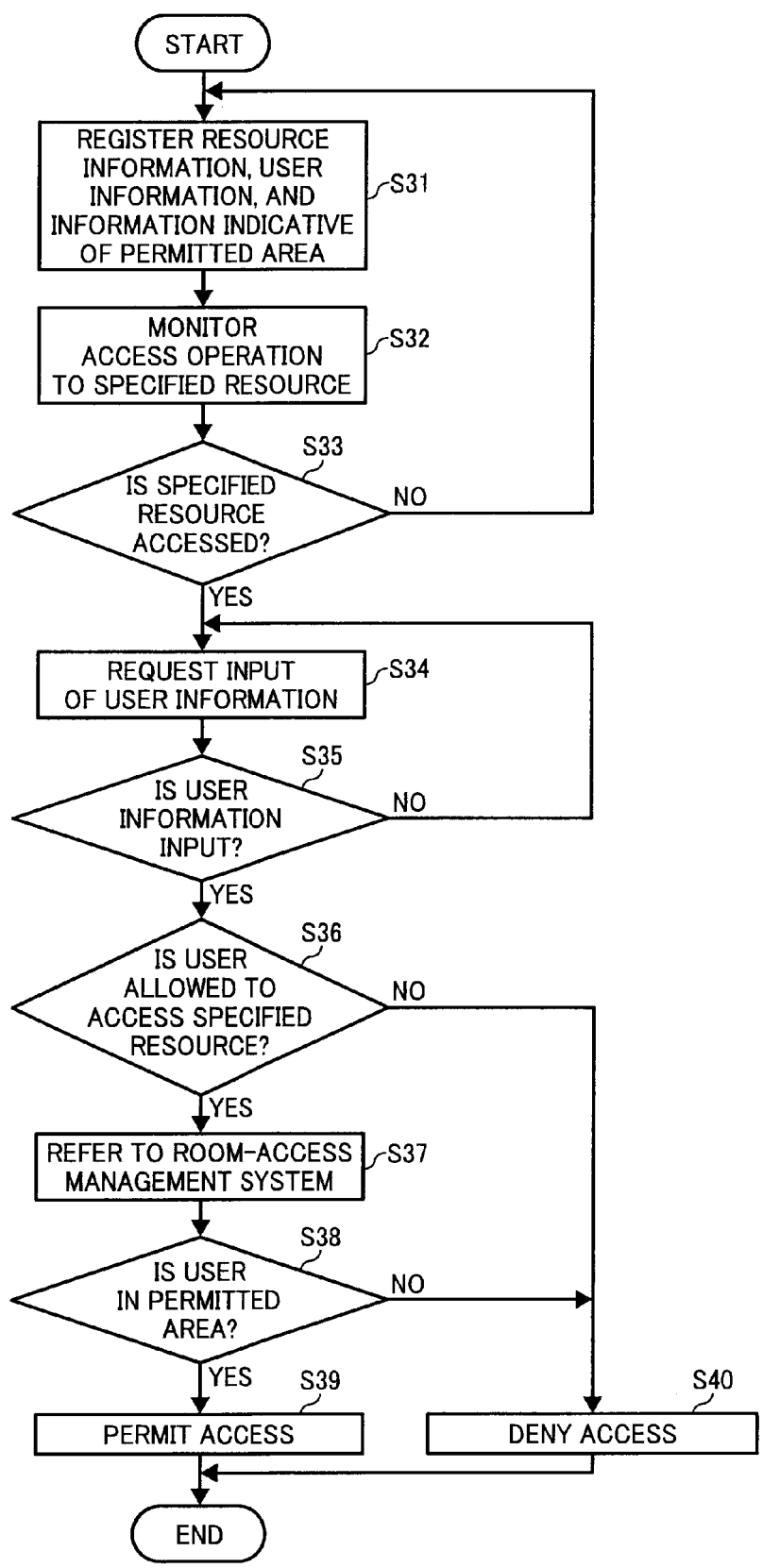
FIG. 6 is a flowchart of an authentication process for permitting an access when a user is in a predetermined permitted area according to the second embodiment.

FIG. 6 is a flowchart of an authentication process performed by the access authentication server 410 for permitting an access when a user is in a predetermined permitted area.

The registering unit 11 registers on the authentication management data file 406 information indicative of an access-controlled resource (special resource), user information, information indicative of the permitted area, in an associated manner (Step S31). By registering the permitted area, it is possible to allow the user to access the access-controller resource in various places. Specifically, it is possible to permit the access in a place remote from a place where the access-controlled resource is set and in a specific floors and buildings in the same place. For example, the access can be allowed in a research and development institute remote from a head office.

Processes performed at Steps S32 to S37 are the same as those performed at Steps S12 to S17, and the same explanations are not repeated.

As a result of reference at Step S37, when it is confirmed that the user is in the permitted area of the access-controlled resources (Yes at Step S38), the determining unit 405 determines to permit the access to the access-controlled resource and sends a notice of access permission to the user (Step S39). On the other hand, when it is confirmed that the user is out of the permitted area of the access-controlled resources (No at Step S38), the determining unit 405 determines to deny the access to the access-controlled resource and sends a notice of access denial to the user (Step S40).

Figure 7:
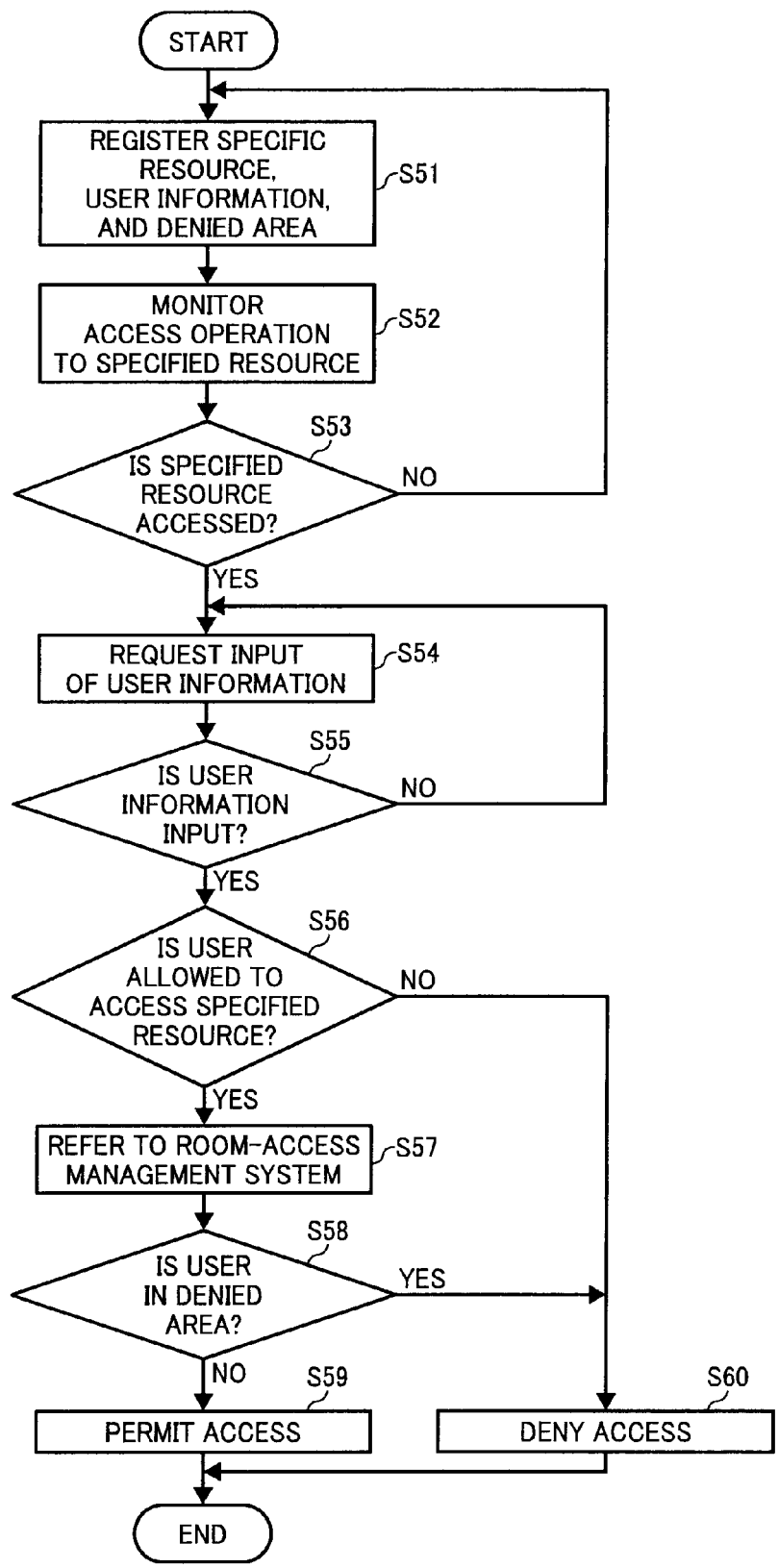
FIG. 7 is a flowchart of an authentication process for denying an access when a user is in a predetermined denied area according to the second embodiment.

FIG. 7 is a flowchart of an authentication process performed by the access authentication server 410 for denying an access when a user is in a predetermined denied area.

The registering unit 11 registers on the authentication management data file 406 information indicative of an access-controlled resource (special resource), user information, information indicative of the denied area, in an associated manner (Step S51). By registering the denied area, it is possible to focus on an area where the access to the access-controlled resource is denied upon performing the access control.

Processes performed at Steps S52 to S57 are the same as those performed at Steps S12 to S17, and the same explanations are not repeated.

As a result of reference at Step S57, when it is confirmed that the user is out of the denied area of the access-controlled resources (No at Step S58), the determining unit 405 determines to permit the access to the access-controlled resource and sends a notice of access permission to the user (Step S59). On the other hand, when it is confirmed that the user is in the denied area of the access-controlled resources (Yes at Step S58), the determining unit 405 determines to deny the access to the access-controlled resource and sends a notice of access denial to the user (Step S60).

As described above, in the network authentication system according to the second embodiment, information indicative of the permitted area where the access to the access-controlled resource is allowed is registered with respect to user information and the access-controlled resource. Then, when it is confirmed that the user is in the permitted area, the determining unit 405 determines to permit the access to the access-controlled resource. Therefore, it is possible to permit the access in a place remote from a place where the access-controlled resource is set and in a specific floors and buildings in the same place.

Furthermore, information indicative of the denied area where the access to the access-controlled resource is denied is registered with respect to user information and the access-controlled resource. Then, when it is confirmed that the user is in the denied area, the determining unit 405 determines to deny the access to the access-controlled resource. Therefore, it is possible to focus on an area where the access to the access-controlled resource is denied upon performing the access control.

Thus, according to the second embodiment, it is possible to prevent leakage of information, such as confidential information, in a place other than a permitted place. Moreover, it is possible to prevent leakage of information caused by fraudulent accesses.

A third embodiment of the present invention is described below. A network authentication system according to the third embodiment performs authentication of a network connection of a first wireless communication terminal (personal computer (PC)) to a network via a second wireless communication terminal (access point) in a wireless LAN.

Figure 8:
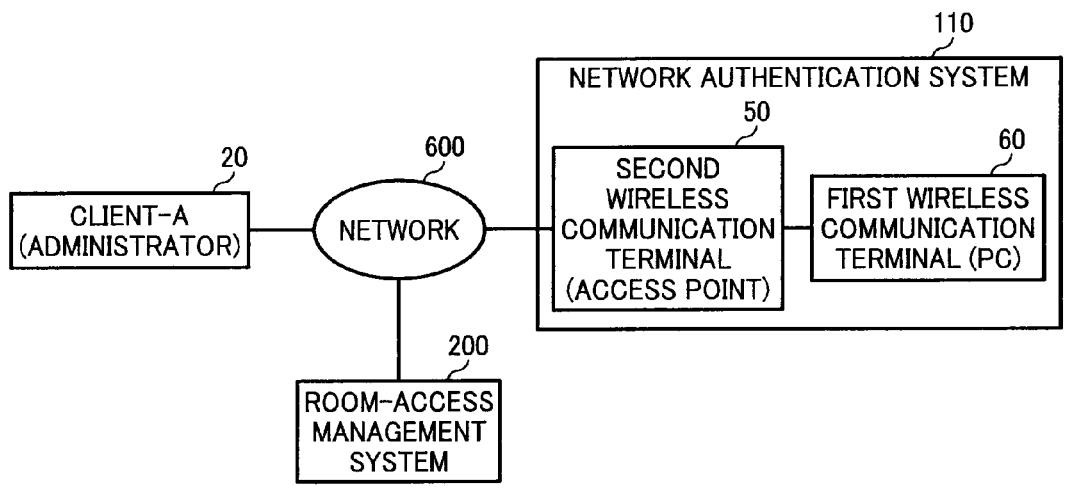
FIG. 8 is a schematic diagram of a network configuration including a network authentication system according to a third embodiment of the present invention.

FIG. 8 is a schematic diagram of a network configuration including a network authentication system 110 according to the third embodiment. The network authentication system 110 includes a second wireless communication terminal 50 and a first wireless communication terminal 60. The second wireless communication terminal 50 is connected to the client-A 20 and the room-access management system 200 via a wireless network 600.

The room-access management system 200 is the same as that described in the first embodiment, and connected to the second wireless communication terminal 50 via the network 600. Therefore, the second wireless communication terminal 50 can acquire the entry-exit log data from the room-access management system 200.

Figure 9:
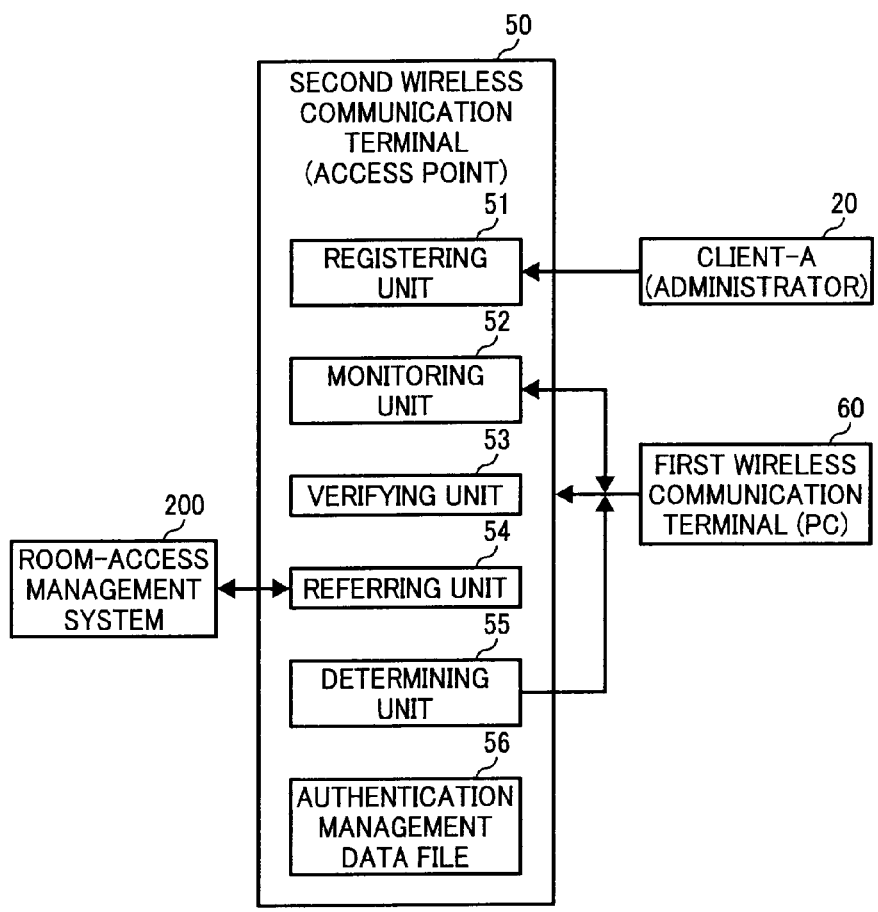
FIG. 9 is a block diagram of a second wireless communication terminal shown in FIG. 8.

FIG. 9 is a block diagram of the second wireless communication terminal 50. Arrows in FIG. 9 indicate data flow in an authentication process performed by the network authentication system 110. The second wireless communication terminal 50 includes a registering unit 51, a monitoring unit 52, a verifying unit 53, a referring unit 54, a determining unit 55, and an authentication management data file 56. According to the third embodiment, the second wireless communication terminal 50 corresponds to an access point and the first wireless communication terminal 60 corresponds to a PC for a connection to a backbone network using a wireless LAN.

The authentication management data file 56 stores therein a physical address for identifying the first wireless communication terminal 60 and user information of a user of the first wireless communication terminal 60, in an associated manner.

The registering unit 51 generates the authentication management data file 56 with no data in a recording medium such as an HDD. Upon receiving data from the first wireless communication terminal 60 operated by a network administrator, the registering unit 51 registers the physical address of the first wireless communication terminal 60 allowed to connect to the network 600 and the user information of a user of the first wireless communication terminal 60 on the authentication management data file 56, in an associated manner. In this state, a user whose user information is registered on the authentication management data file 16 is allowed to access the access-controlled resource. The user information is the same as that described in the first embodiment.

The monitoring unit 52 monitors a network connection operation performed by the first wireless communication terminal 60. When a connection request is issued from the first wireless communication terminal 60, the monitoring unit 52 extracts a physical address from a signal of the connection request.

The verifying unit 53 verifies whether a physical address identical to the physical address extracted by the monitoring unit 52 is registered on the authentication management data file 56, and determines whether the first wireless communication terminal 60 that has issued the connection request is identical to the first wireless communication terminal 60 registered on the authentication management data file 56.

The referring unit 54 identifies by referring to the authentication management data file 56 user information corresponding to the first wireless communication terminal 60 that has been determined by the verifying unit 53 to be identical to the first wireless communication terminal 60 registered on the authentication management data file 56. Then, the referring unit 54 refers to the room-access management system 200 to check the entry-exit log data, with respect to the user identified by the user information, and determines whether the user of the first wireless communication terminal 60 that has issued the connection request is in a predetermined place. The predetermined place can be any places.

The determining unit 55 receives a result of a reference from the referring unit 54. When the user of the first wireless communication terminal 60 that has issued the connection request is in a predetermined place, the determining unit 55 determines to accept the connection request and sends a notice of connection acceptance to the first wireless communication terminal 60.

Figure 10:
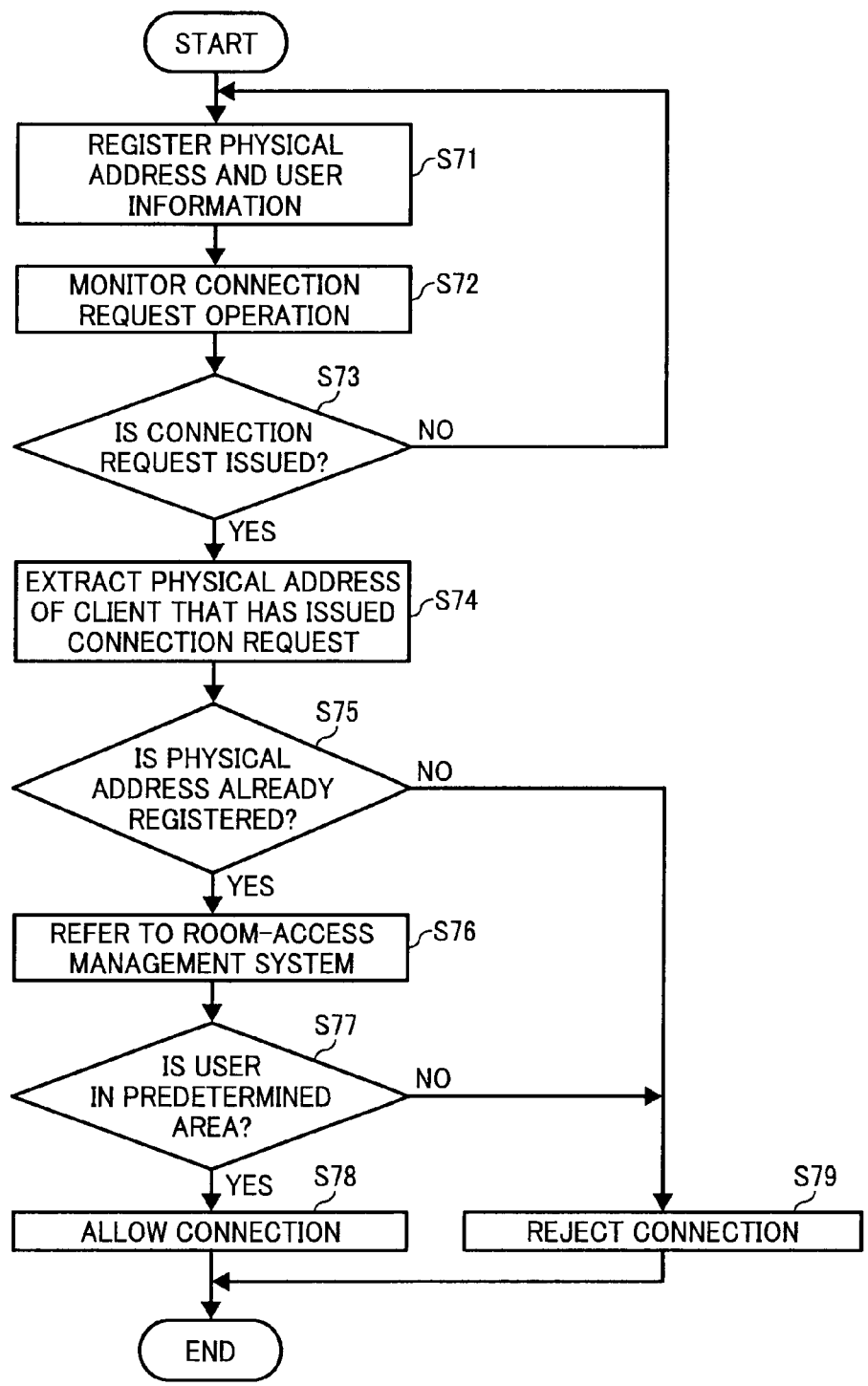
FIG. 10 is a flowchart of an authentication process according to the third embodiment.

FIG. 10 is a flowchart of an authentication process performed by the second wireless communication terminal 50.

The registering unit 51 registers on the authentication management data file 56 the physical address of the first wireless communication terminal 60 and the user information of a user of the first wireless communication terminal 60, in an associated manner (Step S71). The monitoring unit 52 monitors operation of a network connection request performed by the first wireless communication terminal 60 (Step S72). When the network connection request is issued (Yes at Step S73), the monitoring unit 52 extracts the physical address of the first wireless communication terminal 60 that has issued the network connection request from a signal of the network connection request (Step S74).

The verifying unit 53 verifies whether a physical address identical to the physical address extracted by the monitoring unit 52 is registered on the authentication management data file 56 (Step S75). When it is determined that a physical address identical to the physical address extracted by the monitoring unit 52 is registered on the authentication management data file 56 (Yes at Step S75), the referring unit 54 refers to the room-access management system 200 to check the entry-exit log data with respect to the user of the first wireless communication terminal 60 (Step S76).

On the other hand, when it is determined that a physical address identical to the physical address extracted by the monitoring unit 52 is not registered on the authentication management data file 56 (No at Step S75), the determining unit 55 determines to reject the network connection request and sends a notice of connection refusal to the first wireless communication terminal 60 (Step S79).

As a result of reference at Step S76, when it is confirmed that the user of the first wireless communication terminal 60 that has issued the connection request is in a predetermined place (Yes at Step S77), the determining unit 55 determines to accept the network connection request and sends a notice of connection acceptance to the first wireless communication terminal 60 (Step S78).

On the other hand, when it is confirmed that the user of the first wireless communication terminal 60 that has issued the connection request is out of the predetermined place (No at Step S77), the determining unit 55 determines to reject the network connection request and sends a notice of connection refusal to the first wireless communication terminal 60 (Step S79).

As described above, in the network authentication system according to the third embodiment, when the first wireless communication terminal 60 issues a connection request to the network 600, the physical address of the first wireless communication terminal 60 is extracted from the connection request. Then, the verifying unit 53 verifies whether the physical address registered on the authentication management data file 56 is identical to the extracted physical address. When it is determined that the user identified by the user information corresponding to the physical address identified by the verifying unit 53 is in a predetermined place, the determining unit 55 determines to accept network connection of the first wireless communication terminal 60. Furthermore, when it is determined that the user is out of the predetermined place, the determining unit 55 determines to reject network connection of the first wireless communication terminal 60. Therefore, it is possible to prevent leakage of information, such as confidential information, in a place other than a permitted place. Moreover, it is possible to prevent leakage of information caused by fraudulent accesses.

Furthermore, even when radio waves spread out of a controlled area, it is possible to prevent network connection of a fraudulent user without employing high-security encryption methods and high-security authentication methods.

Moreover, it is possible to precisely set areas for allowing accesses and wireless connections in one place depending on practical use. Thus, usability and security can be enhanced at the same time.

Furthermore, it is possible to set areas where accesses and wireless connections are not allowed in one place. Thus, practical operations can be achieved.

The network connection can be controlled with respect to each first wireless communication terminal, or with respect to each area.

A fourth embodiment of the present invention is described below. A network authentication system according to the fourth embodiment controls network connection based on whether a user is in and out of a predetermined place and a predetermined area.

A network configuration of the network authentication system according to the fourth embodiment is the same as that of the third embodiment. FIG. 11 is a block diagram of a second wireless communication terminal 1150 according to the fourth embodiment. The second wireless communication terminal 1150 includes the registering unit 51, the monitoring unit 52, the verifying unit 53, the referring unit 54, a determining unit 1155, and an authentication management data file 1156. Functions and configurations of the registering unit 51, the monitoring unit 52, the verifying unit 53, and the referring unit 54 are the same as those described in the third embodiment.

The authentication management data file 1156 stores therein user information, physical address of the first wireless communication terminal 60 operated by the user identified by the user information, permitted area, and denied area in an associated manner. The registering unit 51 registers the user information, the physical address, the permitted area, and the denied area upon receipt from a network administrator. It is assumed in the fourth embodiment that the permitted area and the denied area are within a predetermined place; however, it is not thus limited. Furthermore, MAC address is used as the physical address according to the fourth embodiment; however, it is not thus limited. FIG. 12 is a table of an example of the authentication management data file 1156. Specifically, it can be seen from FIG. 12 that a user identified by user information of "ID0001" operates the first wireless communication terminal 60 identified by a physical address of "00007naabbcc". Network connection of the first wireless communication terminal 60 is allowed when the user is in a permitted area "area A" and rejected when the user is in a denied area "area B".

The determining unit 1155 determines to accept the network connection when the referring unit 54 confirms from the authentication management data file 1156 that the user is in a permitted area associated with the user information and out of a denied area associated with the user information. Furthermore, the determining unit 1155 determines to reject the network connection when the referring unit 54 confirms from the authentication management data file 1156 that the user is in a denied area associated with the user information and out of a permitted area associated with the user information.

Figure 13:
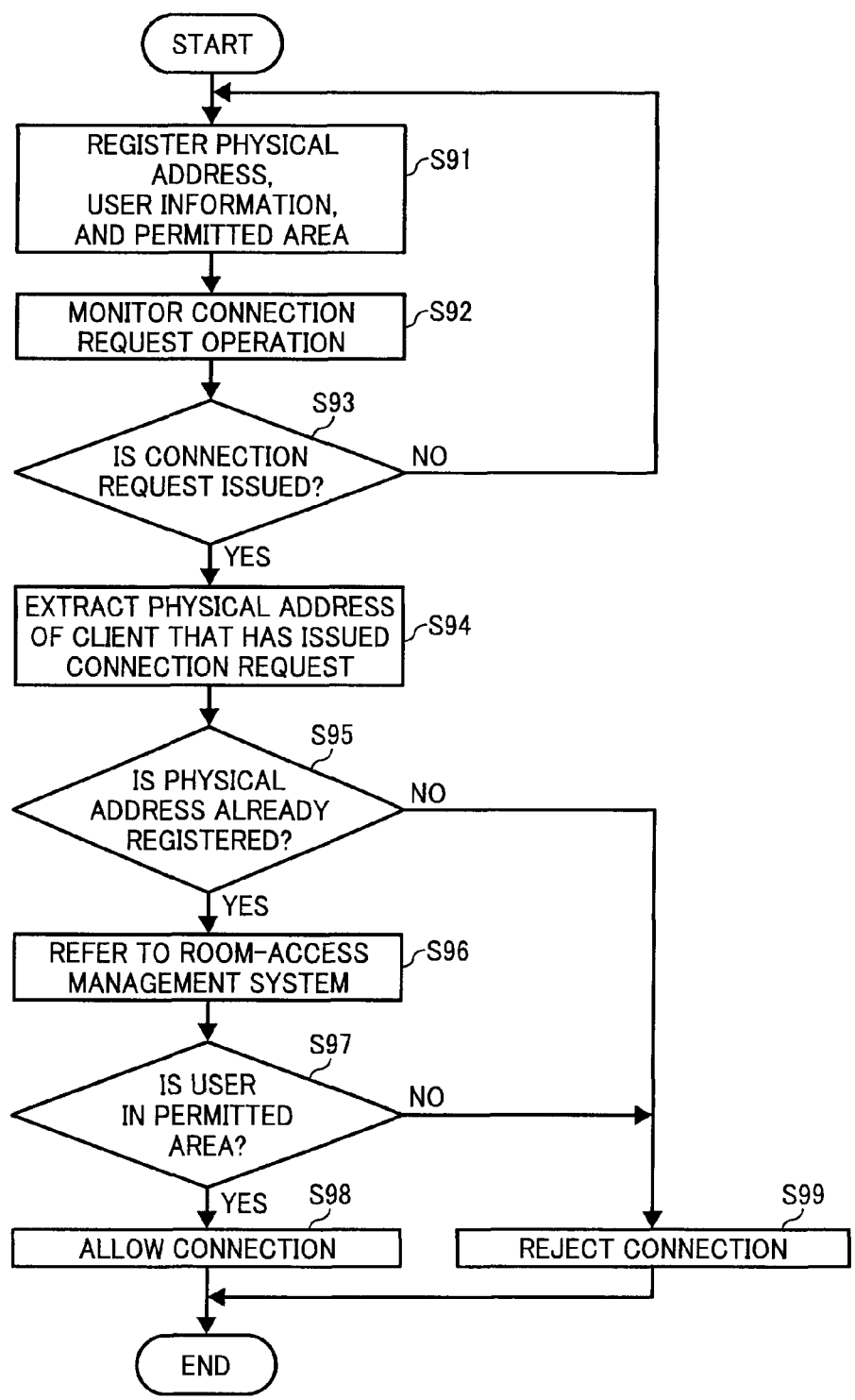
FIG. 13 is flowchart of an authentication process for accepting network connection from a user when the user is in a predetermined permitted area according to the fourth embodiment.

FIG. 13 is a flowchart of an authentication process performed by the second wireless communication terminal 1150 for accepting network connection when a user is in a predetermined permitted area.

Upon receiving data from a network administrator, the registering unit 51 registers on the authentication management data file 1156 user information, physical address, and information indicative of a permitted area, in an associated manner (Step S91). By registering the permitted area, it is possible to allow the user to access the access-controller resource in various places. Specifically, it is possible to permit the access in a place remote from a place where the access-controlled resource is set and in a specific floors and buildings in the same place.

Processes performed at Steps S92 to S96 are the same as those performed at Steps S72 to S76 described in the third embodiment, and the same explanations are not repeated.

As a result of reference at Step S96, when it is confirmed that the user of the first wireless communication terminal 60 that has issued the connection request is in the permitted area associated with the user information (Yes at Step S97), the determining unit 1155 determines to accept the network connection request and sends a notice of connection acceptance to the first wireless communication terminal 60 (Step S98).

On the other hand, when it is confirmed that the user of the first wireless communication terminal 60 that has issued the connection request is out of the permitted area associated with the user information (No at Step S97), the determining unit 55 determines to reject the network connection request and sends a notice of connection refusal to the first wireless communication terminal 60 (Step S99).

Figure 14:
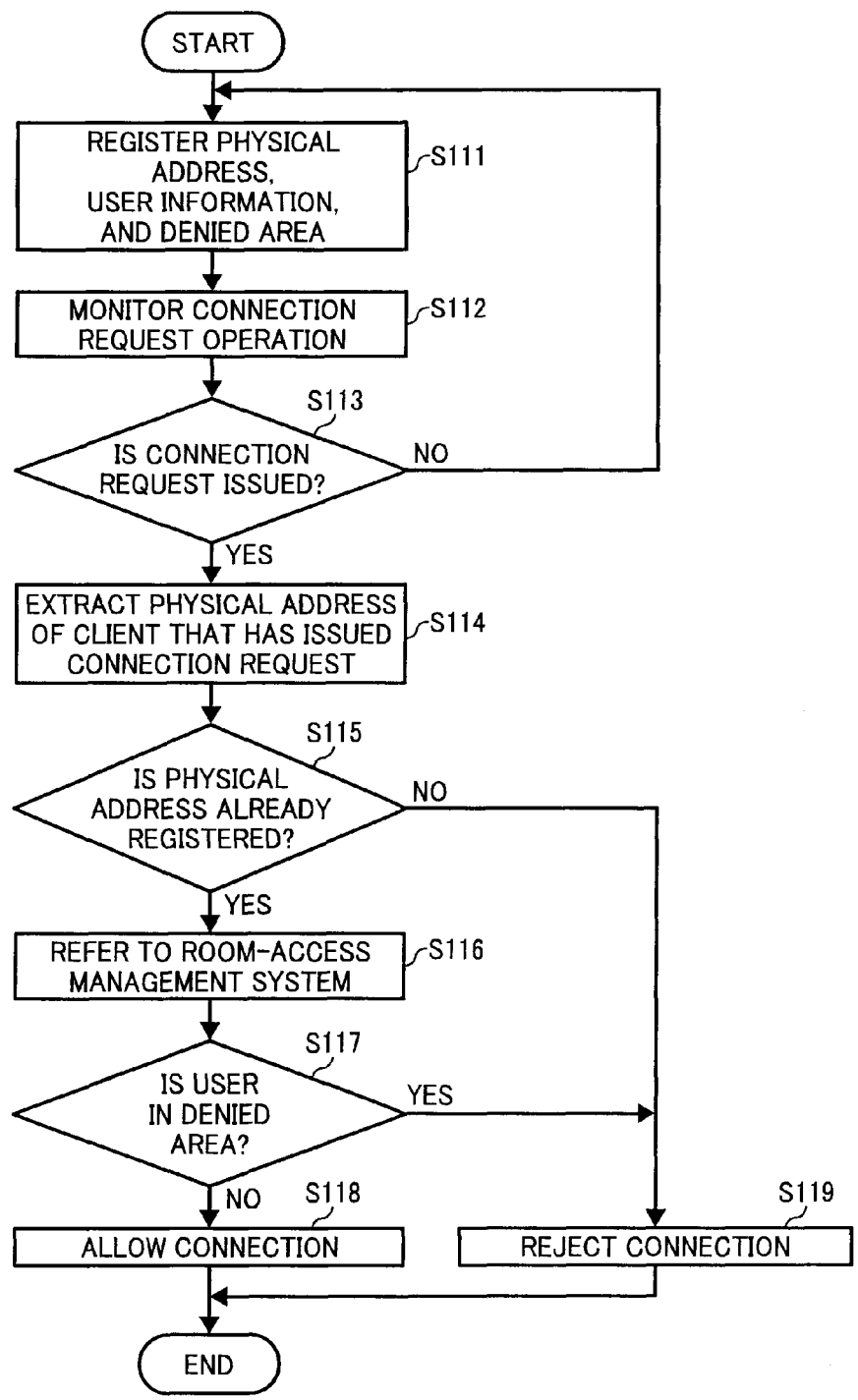
FIG. 14 is a flowchart of an authentication process for rejecting network connection from a user when the user is in a predetermined denied area according to the fourth embodiment.

FIG. 14 is a flowchart of an authentication process performed by the second wireless communication terminal 1150 for rejecting network connection from a user when the user is in a predetermined denied area.

Upon receiving data from a network administrator, the registering unit 51 registers on the authentication management data file 1156 user information, physical address, and information indicative of a denied area, in an associated manner (Step S111). By registering the denied area, it is possible to focus on an area where the network connection from the user is denied upon performing the network connection control.

Processes performed at Steps S112 to S116 are the same as those performed at Steps S72 to S76 described in the third embodiment, and the same explanations are not repeated.

As a result of reference at Step S96, when it is confirmed that the user of the first wireless communication terminal 60 that has issued the connection request is out of the denied area associated with the user information (No at Step S117), the determining unit 1155 determines to accept the network connection request and sends a notice of connection acceptance to the first wireless communication terminal 60 (Step S118).

On the other hand, when it is confirmed that the user of the first wireless communication terminal 60 that has issued the connection request is in the denied area associated with the user information (Yes at Step S117), the determining unit 55 determines to reject the network connection request and sends a notice of connection refusal to the first wireless communication terminal 60 (Step S119).

As described above, according to the fourth embodiment, the permitted area where the network connection is accepted is registered with respect to the user on the authentication management data file 1156. When it is confirmed that the user who has access to the network is in the permitted area associated with the user information, the determining unit 1155 determines to accept the network connection of the first wireless communication terminal 60. Therefore, it is possible to permit the network connection in different areas, specific floors, and specific buildings in the same place.

Furthermore, the denied area where the network connection is rejected is registered with respect to the user on the authentication management data file 1156. When it is confirmed that the user who has access to the network is in the denied area associated with the user information, the determining unit 1155 determines to reject the network connection of the first wireless communication terminal 60. Therefore, it is possible to focus on an area where the network connection from the user is denied upon performing the network connection control.

Thus, it is possible to prevent leakage of information, such as confidential information, in a place other than a permitted place. Moreover, it is possible to prevent leakage of information caused by fraudulent accesses.

A fifth embodiment of the present invention is described below. A network authentication system according to the fifth embodiment has a function of determining to accept a network connection when a distance between the first wireless communication terminal 60 and a second wireless communication terminal is within a predetermined permitted range in addition to the same functions as those described in the third embodiment.

Figures 15, 16:
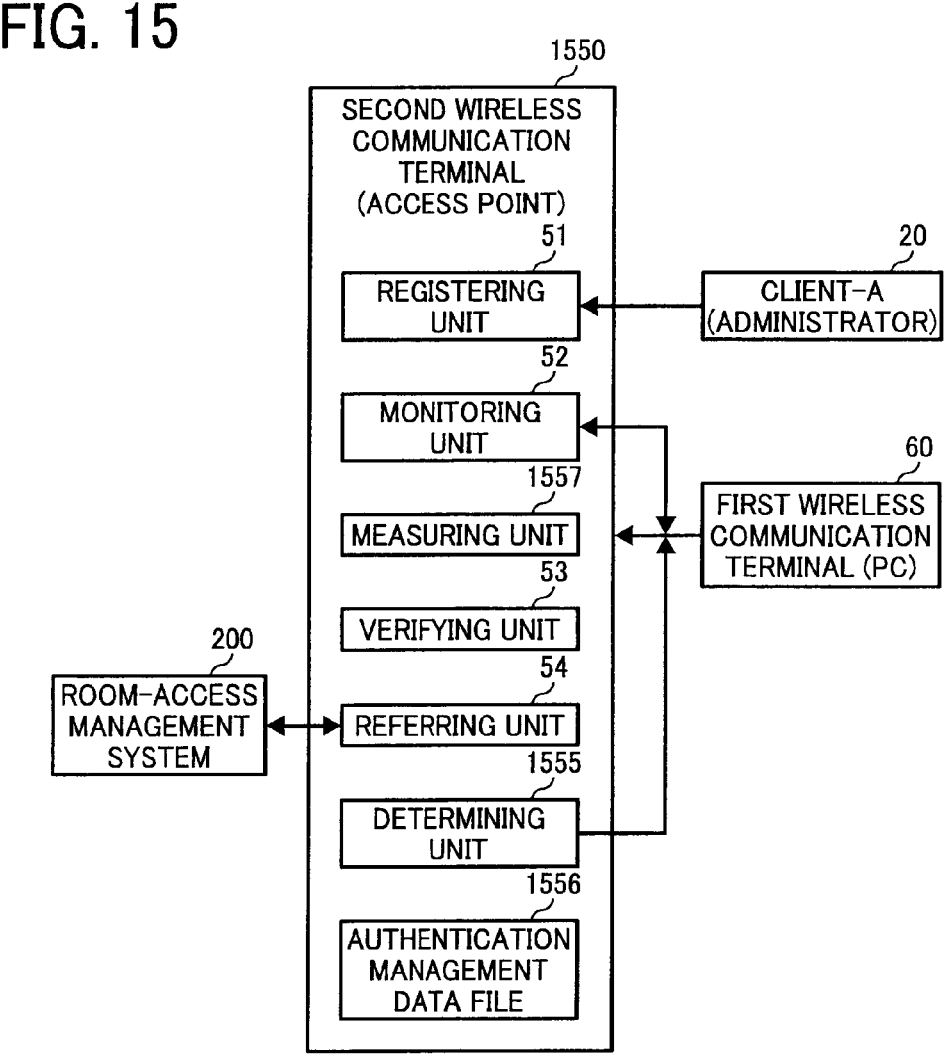
FIG. 15 is a block diagram of a second wireless communication terminal according to a fifth embodiment of the present invention.
FIG. 16 is a table of an example of an authentication management data file shown in FIG. 15.

The network authentication system according to the fifth embodiment has the same configuration as that of the third embodiment. FIG. 15 is a block diagram of a second wireless communication terminal 1550 according to the fifth embodiment. The second wireless communication terminal 1550 includes the registering unit 51, the monitoring unit 52, a measuring unit 1557, the verifying unit 53, the referring unit 54, a determining unit 1555, and an authentication management data file 1556. Functions and configurations of the registering unit 51, the verifying unit 53, and the referring unit 54 are the same as those of the third embodiment.

The authentication management data file 1556 stores therein user information, physical address of the first wireless communication terminal 60 operated by the user identified by the user information, and permitted range in an associated manner. The registering unit 51 registers the user information, the physical address, and the permitted range upon receiving data from a network administrator. The permitted range means a range of distance for determining whether to accept a network connection request. Furthermore, the physical address is not limited to MAC address used in the fourth embodiment.

FIG. 16 is a table of an example of the authentication management data file 1556. It can be seen from FIG. 16 that a user identified by user information of "ID0001" operates the first wireless communication terminal 60 identified by a physical address of "00007naabbcc". Network connection of the first wireless communication terminal 60 is allowed when a distance between the first wireless communication terminal 60 and the second wireless communication terminal 1550 is within a permitted range of 10 meters or less. That is, when the distance between the first wireless communication terminal 60 and the second wireless communication terminal 1550 is longer than 10 meters, network connection from the first wireless communication terminal 60 is rejected.

The measuring unit 1557 measures a distance between the first wireless communication terminal 60 and the second wireless communication terminal 1550 when the first wireless communication terminal 60 issues a network connection request. A measurement is performed using a received signal strength indication (RSS) method or other known techniques.

Upon receipt of the network connection request from the first wireless communication terminal 60, the determining unit 1555 determines whether the distance measured by the measuring unit 1557 is within the permitted range associated with the first wireless communication terminal 60 by referring to the authentication management data file 1556. When the distance measured by the measuring unit 1557 is out of the permitted range associated with the first wireless communication terminal 60, the determining unit 1555 determines to reject the network connection of the first wireless communication terminal 60.

The monitoring unit 52 monitors whether the first wireless communication terminal 60 issues the network connection request. When the first wireless communication terminal 60 issues the network connection request, and if the determining unit 1555 determines that the distance measured by the measuring unit 1557 is within the permitted range, the monitoring unit 52 extracts the address information as identification information of the client terminal from the network connection request.

Figure 17:
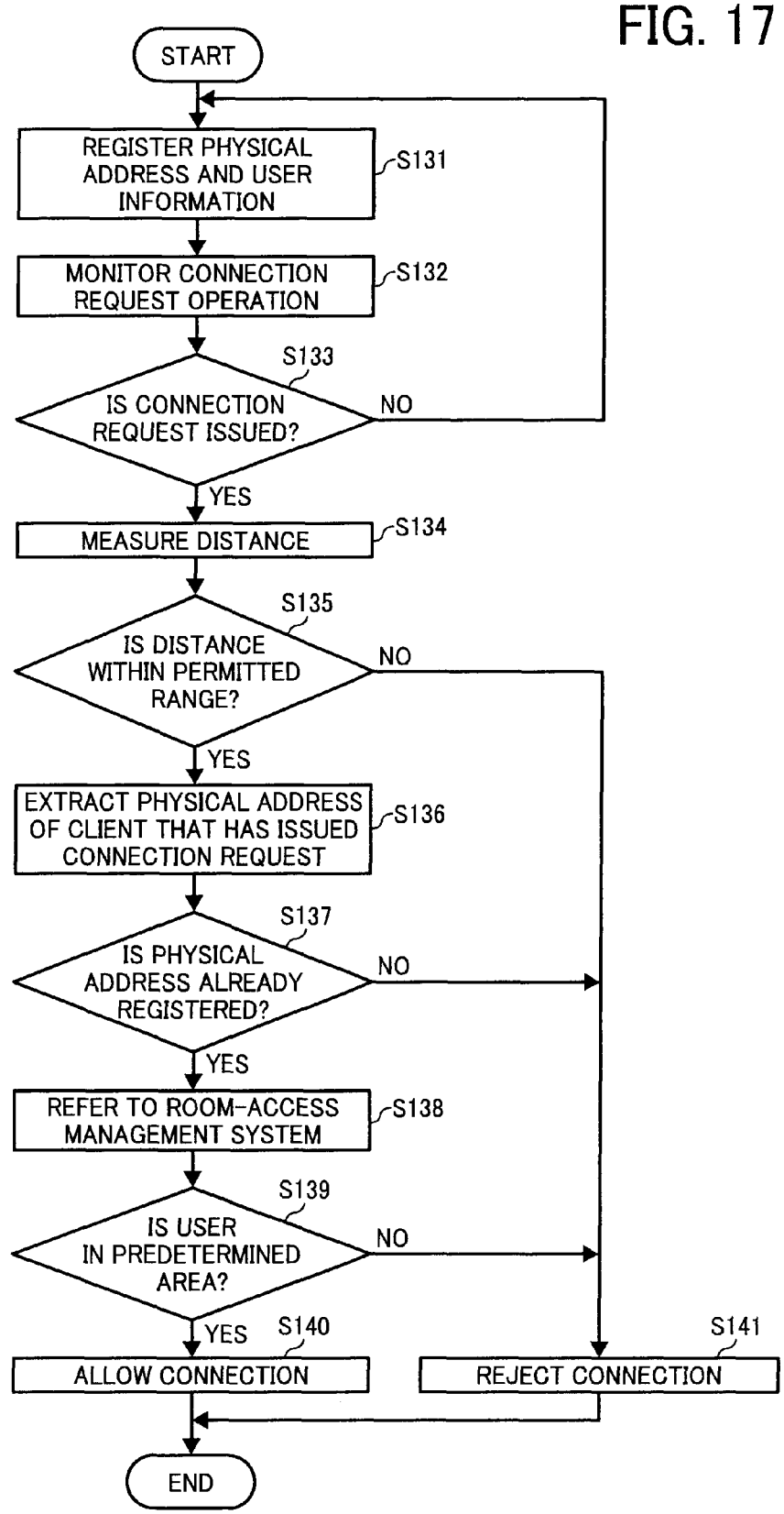
FIG. 17 is a flowchart of an authentication process according to the fifth embodiment.

FIG. 17 is a flowchart of an authentication process performed by the second wireless communication terminal 1550.

Upon receiving data from a network administrator, the registering unit 51 registers on the authentication management data file 1556 physical address and the user information of the first wireless communication terminal 60, and information indicative of a permitted range, in an associated manner (Step S131). The monitoring unit 52 monitors operation of a network connection request performed by the first wireless communication terminal 60 (Step S132). When the network connection request is issued (Yes at Step S133), the measuring unit 1557 measures a distance between the second wireless communication terminal 1550 and the first wireless communication terminal 60 (Step S134).

The determining unit 1555 determines whether the measured distance is within the permitted range associated with the first wireless communication terminal 60 by referring to the authentication management data file 1556 (Step S135). When the distance is out of the permitted range (No at Step S135), the determining unit 1555 determines to reject the network connection of the first wireless communication terminal 60 and sends a notice of connection refusal to the first wireless communication terminal 60 (Step S134).

On the other hand, when the distance is within the permitted range (Yes at Step S135), the determining unit 1555 extracts the physical address of the first wireless communication terminal 60 from the signal of the network connection request (Step S136).

Processes performed at Steps S137 to S141 are the same as those performed at Steps S75 to S79 described in the third embodiment, and the same explanations are not repeated.

As described above, according to the fifth embodiment, when the first wireless communication terminal 60 issues the network connection request, the determined unit determines whether the distance between the first wireless communication terminal 60 and the second wireless communication terminal 1550 is within the permitted range. When the distance is out of the permitted range, the determining unit determines to reject the network connection request. Therefore, it is possible to effectively control accesses to resources on the network and network connections by fraudulent accesses from a place other than the permitted place based on the distance between the first wireless communication terminal 60 and the second wireless communication terminal 1550. Thus, it is possible to prevent leakage of information.

A sixth embodiment of the present invention is described below. A network authentication system according to the sixth embodiment determines to accept and reject network connection from the first wireless communication terminal 60 based only on a distance between the first wireless communication terminal 60 and the second wireless communication terminal 1550 without referring to the room access management system.

Figure 18:
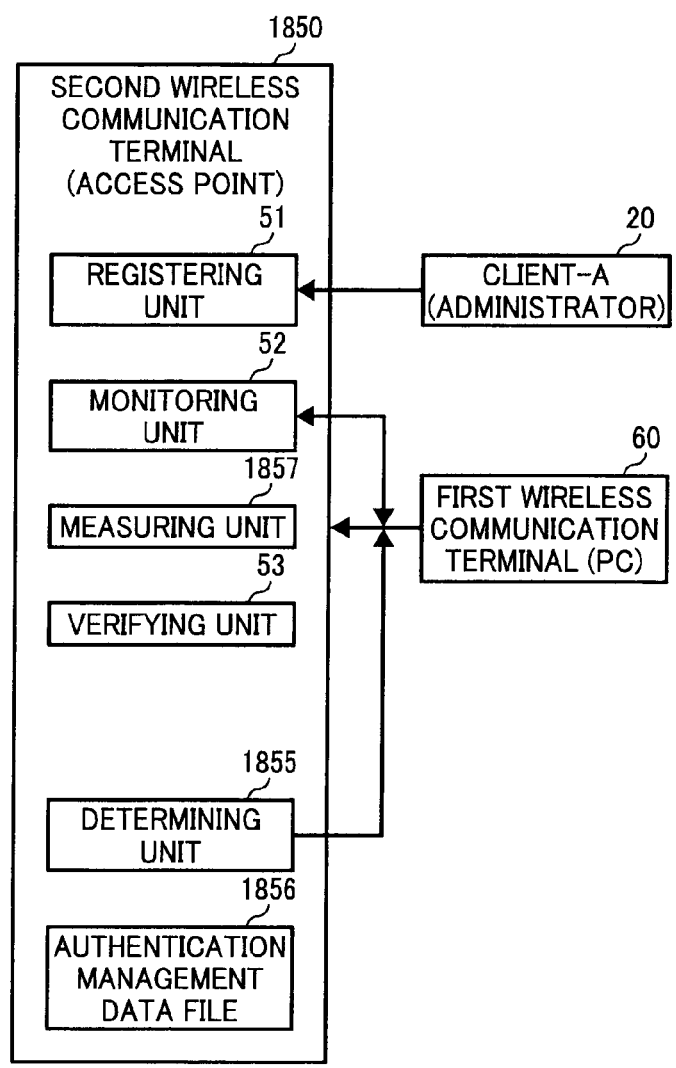
FIG. 18 is a block diagram of a second wireless communication terminal according to a sixth embodiment of the present invention.

The network authentication system according to the sixth embodiment is the same network configuration as that of the third embodiment but does not have the room-access management system 200. FIG. 18 is a block diagram of a second wireless communication terminal 1850 according to the sixth embodiment. The second wireless communication terminal 1850 includes the registering unit 51, the monitoring unit 52, a measuring unit 1857, the verifying unit 53, a determining unit 1855, and an authentication management data file 1856. The registering unit 51, the monitoring unit 52, and the verifying unit 53 are the same as those of the third embodiment. The second wireless communication terminal 1850 does not include a referring unit unlike those of the third to the fifth embodiments.

The authentication management data file 1856 stores therein user information, physical address of the first wireless communication terminal 60 operated by the user identified by the user information, and permitted range in an associated manner. The registering unit 51 registers the user information, the physical address, and the permitted range upon receiving data from a network administrator. The permitted range means a range of distance for determining whether to accept a network connection request. The physical address is not limited to MAC address used in the fifth embodiment.

The authentication management data file 1856 stores therein data similar to those described in connection with FIG. 16 in the fifth embodiment. Specifically, in the example shown in FIG. 16, a user identified by user information of "ID0001" operates the first wireless communication terminal 60 identified by a physical address of "00007naabbcc". Network connection of the first wireless communication terminal 60 is allowed when a distance between the first wireless communication terminal 60 and the second wireless communication terminal 1550 is within a permitted range of 10 meters or less. That is, when the distance between the first wireless communication terminal 60 and the second wireless communication terminal 1550 is longer than 10 meters, network connection from the first wireless communication terminal 60 is rejected.

The measuring unit 1857 measures a distance between the first wireless communication terminal 60 and the second wireless communication terminal 1850.

When the physical address of the first wireless communication terminal 60 that has issued a network connection request is registered on the authentication management data file 1856, the determining unit determines whether the distance measured by the measuring unit 1857 is within the permitted range associated with the first wireless communication terminal 60 by referring to the authentication management data file 1856. When the distance measured by the measuring unit 1857 is within the permitted range associated with the first wireless communication terminal 60, the determining unit determines to accept the network connection request of the first wireless communication terminal 60. On the other hand, when the distance measured by the measuring unit 1857 is out of the permitted range associated with the first wireless communication terminal 60, the determining unit determines to reject the network connection request of the first wireless communication terminal 60.

Figure 19:
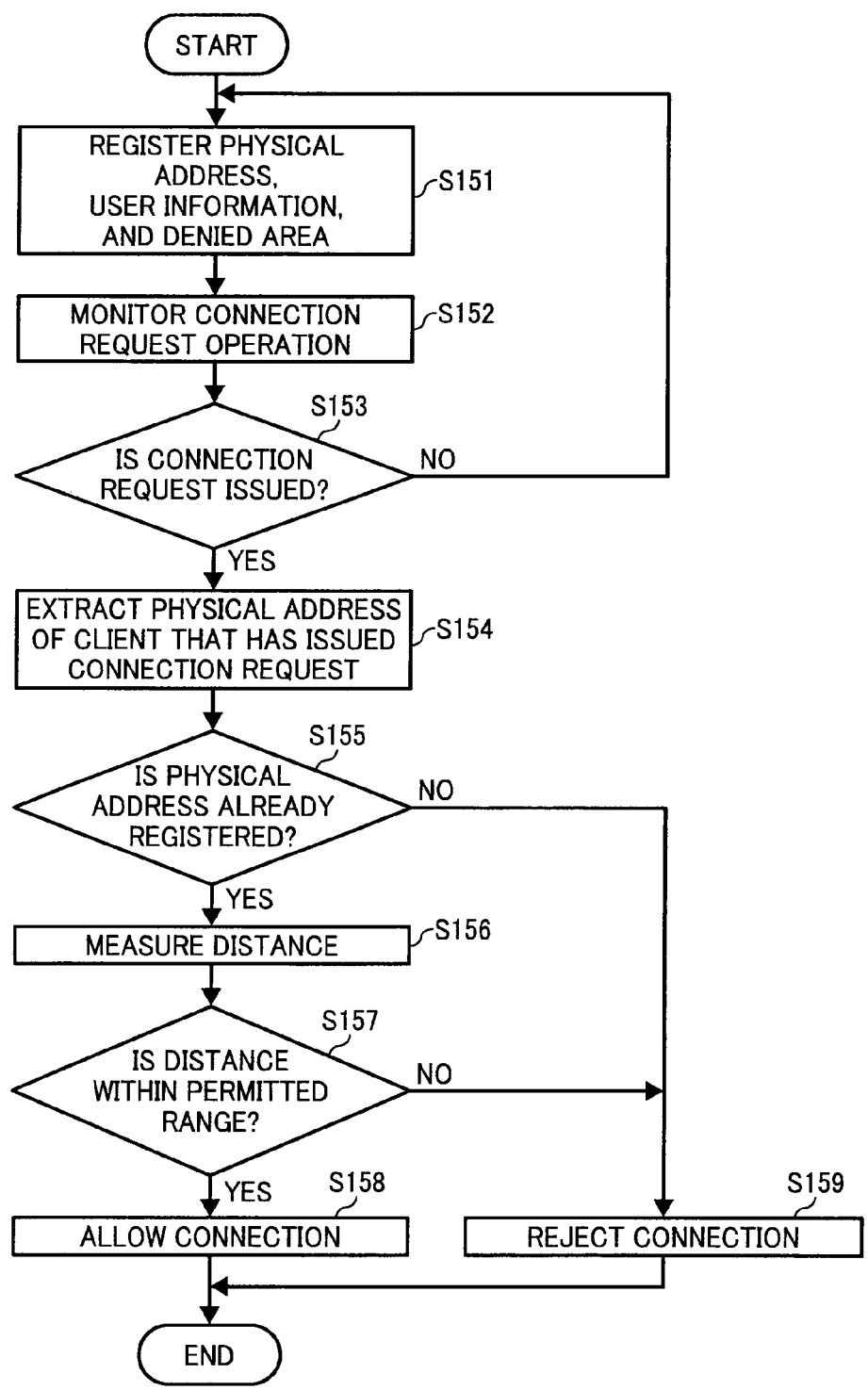
FIG. 19 is a flowchart of an authentication process according to the sixth embodiment.

FIG. 19 is a flowchart of an authentication process performed by the second wireless communication terminal 1850.

The registering unit 51 registers on the authentication management data file 1856 the physical address of the first wireless communication terminal 60, the user information of a user of the first wireless communication terminal 60, and the permitted range, in an associated manner (Step S151). The monitoring unit 52 monitors operation of a network connection request performed by the first wireless communication terminal 60 (Step S152). When the network connection request is issued (Yes at Step S153), the monitoring unit 52 extracts the physical address of the first wireless communication terminal 60 that has issued the network connection request from a signal of the network connection request (Step S154).

The verifying unit 53 verifies whether a physical address identical to the physical address extracted by the monitoring unit 52 is registered on the authentication management data file 1856 (Step S155). When it is determined that a physical address identical to the physical address extracted by the monitoring unit 52 is not registered on the authentication management data file 1856 (No at Step S155), the determining unit 1855 determines to reject the network connection request and sends a notice of connection refusal to the first wireless communication terminal 60 (Step S159).

On the other hand, when it is determined that a physical address identical to the physical address extracted by the monitoring unit 52 is registered on the authentication management data file 1856 (Yes at Step S155), the measuring unit 1857 measures the distance between the first wireless communication terminal 60 and the second wireless communication terminal 1850 (Step S156).

The determining unit 1855 determines whether the measured distance is within the permitted range associated with the first wireless communication terminal 60 by referring to the authentication management data file 1856 (Step S157). When the distance is out of the permitted range (No at Step S157), the determining unit 1855 determines to reject the network connection request and sends a notice of connection refusal to the first wireless communication terminal 60 (Step S159).

On the other hand, when the distance is within the permitted range (Yes at Step S157), the determining unit 1855 determines to accept the network connection request and sends a notice of connection acceptance to the first wireless communication terminal 60 (Step S158).

As described above, according to the sixth embodiment, when the physical address of the first wireless communication terminal 60 that has issued the network connection request is registered on the authentication management data file 1856, and if distance measured by the measuring unit 1857 is within the permitted range associated with the first wireless communication terminal 60, the determining unit 1855 determines to accept the network connection of the first wireless communication terminal 60. Furthermore, when the distance measured by the measuring unit 1857 is out of the permitted range associated with the first wireless communication terminal 60, the determining unit 1855 determines to reject the network connection of the first wireless communication terminal 60. Therefore, it is possible to effectively control accesses to resources on the network and network connections by fraudulent accesses from a place other than the permitted place based only on the distance between the first wireless communication terminal 60 and the second wireless communication terminal 1850. Thus, it is possible to prevent leakage of information.

The present invention in its broader aspects is not limited to the specific details and representative embodiments shown and described above. Accordingly, various modifications can be made without departing from the spirit or scope of the general inventive concept as defined by the appended claims and their equivalents.

For example, as modifications of the fifth and sixth embodiments, it is possible to arrange a third wireless communication terminal and a fourth wireless communication terminal that cooperates with each other to determines whether the first wireless communication terminal 60 is within a predetermined area and determines whether the network connection is accepted. For example, the third and the fourth wireless communication terminals can cooperate such that each of the third and the fourth wireless communication terminals measures a distance between the first wireless communication terminal 60 and the second wireless communication terminal and a measurement result is combined with each other. In this case, it is assumed that locations of the third and the fourth wireless communication terminals are fixed in advance.

The network authentication servers and the second wireless communication terminals according to the embodiments operate by using processes, methods and functions executed by a computer due to a command from a computer program. The computer program is configured such that a command is issued to each of units in the computer and performs predetermined processes and functions. For example, due to the computer program, in the network authentication server, the monitoring unit monitors the access operation to a predetermine resource and requires the user to input the user information when the access operation is performed; the verifying unit verifies the input user information with the registered user information to determine whether the user is allowed to the predetermined resource; the referring unit refers to the room access management system whether the user is in a predetermined place; and the determining unit determines to allow the access to the predetermined resource when the user with access right is in the predetermined place. Thus, the processes and the units according to the embodiments can be realized by a computer program in cooperation with a computer.

Furthermore, the processes and the units can be realized by using a computer readable recording medium storing therein software program codes for realizing the functions. For example, it is possible to configure so that the computer (CPU) of the network authentication server and the second wireless communication terminal reads and executes the program code stored in a recording medium. Moreover, the functions can be realized by directly downloading the computer program via a network without using the recording medium.

In this state, the program codes downloaded and executed from the recording medium or via a communication line realizes the functions of the embodiments. The recording medium having the computer program and the program codes is included in the elements of the present invention.

Examples of the recording medium for storing the program codes include a flexible disk, an HDD, a magneto optical disk, a CD-ROM, a CD-R, a nonvolatile memory card, a ROM, and a magnetic tape.

As described above, according to an aspect of the present invention, it is possible to effectively control accesses to resources on a network from a place other than a permitted place and network communications by users including unknown users and unauthenticated users in a communication environment where broadband communication and wireless communication are widely used.
(Note 1.)

An authentication apparatus that performs an authentication of an access to a resource on a network and a connection to the network by a user, the authentication apparatus comprising:

a storage unit that stores therein a data file that contains first address information for identifying a client terminal operated by a user, first user information for identifying the user, and information on a permitted range of a distance from the client terminal for determining whether to allow a connection request to the network;

a monitoring unit that monitors the client terminal, and when there is a connection request from the client terminal, extracts second address information from the connection request;

a verifying unit that verifies whether the first address information matches the second address information;

a measuring unit that measures a distance between the client terminal and the network; and a determining unit determines whether the distance measured by the measuring unit is within the permitted range corresponding to the address information verified to be matched by the verifying unit, determines to accept the connection request if the distance is within the permitted range, and determines to reject the connection request when the distance is out of the permitted range.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An authentication apparatus that performs an authentication of an access to a resource on a network and a connection to the network by a user, the authentication apparatus comprising:

a memory that stores therein a data file that contains first identification information for identifying one of the user and a client terminal used by the user;

a monitoring unit that monitors the client terminal, and when a predetermined access operation to access the resource from the client terminal is detected, acquires the first identification information from the memory;

a referring unit that acquires second identification indicating an entry status of the user to a physical facility;

a verifying unit that verifies whether the first identification information matches the second identification information, and when it is verified that the first identification information matches the second identification information, refers to a room-access management system that is connected to the network and manages the entry status of the user to the physical facility to check the entry status of the user to the physical facility; and a determining unit that determines whether to allow the access operation based on a result from the verifying unit, wherein the determining unit determines to allow an access operation to an access-controlled resource when the result indicates that the user is located within the facility where the access-controlled resource is located.

2. The authentication apparatus according to claim 1, wherein the client terminal is operated by the user for accessing the resource on the network, the data file further contains resource information on the access-controlled resource and first user information for identifying the user, when there is the access operation to the access-controlled resource from the client terminal, the monitoring unit requires the user to input second user information, and receives the second user information from the user as the second identification information, the verifying unit verifies whether the first user information matches the second user information, and the determining unit determines whether to allow the access operation to the access-controlled resource based on the result from the verifying unit.

3. The authentication apparatus according to claim 2, wherein
the data file further contains information on a permitted area in which an access to the access-controlled resources is allowed, and
the determining unit determines to allow the access operation to the access-controlled resource when the result says that the user is in the permitted area.

4. The authentication apparatus according to claim 2, wherein
the data file further contains information on a denied area in which an access to the access-controlled resources is denied, and
the determining unit determines to deny the access operation to the access-controlled resource when the result says that the user is in the denied area.

5. The authentication apparatus according to claim 2, further comprising:
a registering unit that registers the resource information and the first user information in the data file.

6. The authentication apparatus according to claim 1, wherein
the client terminal is configured to be connected to the network via a wireless communication,
the data file further contains first address information for identifying the client terminal and user information for identifying the user in an associated manner,
the monitoring unit monitors a connection request to the network from the client terminal, and when there is a connection request to the network from the client terminal, extracts second address information of the client terminal from the connection request as the second identification information,
the verifying unit verifies whether the first address information matches the second address information, and
the determining unit determines whether to accept the connection request to the network from the client terminal based on a result from the verifying unit.

7. The authentication apparatus according to claim 6, wherein
the data file further contains information on a permitted area in which the connection request is accepted, and
the determining unit determines to accept the connection request when the result indicates that the user is located within the permitted area.

8. The authentication apparatus according to claim 6, wherein
the data file further contains information on a denied area in which the connection request is denied, and
the determining unit determines to deny the connection request when the result indicates that the user is located within the denied area.

9. The authentication apparatus according to claim 6, further comprising:
a measuring unit that measures a distance between the client terminal to the network, wherein
the data file further contains information on a permitted range in association with the user information, the permitted range indicating a range of a distance for determining whether the connection request is accepted,
the determining unit determines whether the distance measured by the measuring unit is within the permitted range, and when the distance is out of the permitted range, determines to deny the connection request, and
the monitoring unit extracts the second address information as the second identification information from the connection request when the distance measured by the measuring unit is within the permitted range.

10. The authentication apparatus according to claim 6, further comprising:
a registering unit that registers the first address information and the user information in the data file in an associated manner.

11. An authentication method, implemented on an authentication apparatus, of performing an authentication of an access to a resource on a network and a connection to the network by a user, the authentication method comprising:
storing, in a memory of the authentication apparatus, a data file that contains first identification information for identifying one of the user and a client terminal used by the user;
monitoring the client terminal, and when a predetermined access operation to access the resource from the client terminal is detected, acquiring the first identification information from the memory;
acquiring second identification information indicating an entry status of the user to a physical facility;
verifying whether the acquired first identification information matches the second identification information, and when it is verified that the acquired first identification information matches the second identification information, referring to a room-access management system that is connected to the network and manages the entry status of the user to the physical facility to check the entry status of the user to the physical facility; and
determining whether to allow the access operation based on a result at the verifying,
wherein the determining includes determining to allow an access operation to an access-controlled resource when the result indicates that the user is located within the facility where the access-controlled resource is located.

12. A non-transitory computer readable storage medium having stored thereon a computer program that includes instructions for performing an authentication of an access to a resource on a network and a connection to the network by a user which when executed on a computer causes the computer to execute a method comprising:
storing a data file that contains first identification information for identifying one of the user and a client terminal used by the user;
monitoring the client terminal, and when a predetermined access operation to access the resource from the client terminal is detected, acquiring the stored first identification information;
acquiring second identification information indicating an entry status of the user to a physical facility;
verifying whether the acquired first identification information matches the second identification information, and when it is verified that the acquired first identification information matches the second identification information, referring to a room-access management system that is connected to the network and manages the entry status of the user to the physical facility to check the entry status of the user to the physical facility; and
determining whether to allow the access operation based on a result at the verifying,
wherein the determining includes determining to allow an access operation to an access-controlled resource when the result indicates that the user is located within the facility where the access-controlled resource is located.

* * * * *